(12) United States Patent
Jinbo et al.

(10) Patent No.: US 8,426,513 B2
(45) Date of Patent: Apr. 23, 2013

(54) RUBBER COMPOSITION AND TIRE USING THE SAME

(75) Inventors: Naohisa Jinbo, Kodaira (JP); Noriko Mori, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 966 days.

(21) Appl. No.: 12/066,395

(22) PCT Filed: Aug. 30, 2006

(86) PCT No.: PCT/JP2006/017093
§ 371 (c)(1),
(2), (4) Date: Mar. 28, 2008

(87) PCT Pub. No.: WO2007/032209
PCT Pub. Date: Mar. 22, 2007

(65) Prior Publication Data
US 2010/0179274 A1    Jul. 15, 2010

(30) Foreign Application Priority Data
Sep. 15, 2005  (JP) .................................. 2005-268386

(51) Int. Cl.
C09B 67/00    (2006.01)
C08L 39/00    (2006.01)

(52) U.S. Cl.
USPC .......................................... 524/502; 524/516

(58) Field of Classification Search .................... 524/502
See application file for complete search history.

(56) References Cited

U.S. PATENT DOCUMENTS

| | | | | |
|---|---|---|---|---|
| 5,432,232 A | * | 7/1995 | Hattori et al. | 525/99 |
| 5,902,856 A | * | 5/1999 | Suzuki et al. | 525/237 |
| 7,211,630 B2 | * | 5/2007 | Masaki et al. | 525/237 |
| 7,288,594 B2 | * | 10/2007 | Ozawa et al. | 525/105 |
| 2005/0159554 A1 | * | 7/2005 | Endou et al. | 525/242 |
| 2006/0217470 A1 | * | 9/2006 | Mikami et al. | 524/236 |
| 2007/0155902 A1 | * | 7/2007 | Masaki | 525/191 |

FOREIGN PATENT DOCUMENTS

| | | |
|---|---|---|
| EP | 1 462 459 A1 | 9/2004 |
| JP | 62-207342 A | 9/1987 |
| JP | 5-87530 B2 | 12/1993 |
| JP | 6-49279 A | 2/1994 |
| JP | 6-199923 A | 7/1994 |
| JP | 7-053784 A | 2/1995 |
| JP | 07053784 A * | 2/1995 |
| JP | 8-225604 A | 9/1996 |
| JP | 8-231658 A | 9/1996 |
| JP | 9-278844 A | 10/1997 |
| JP | 09278844 A * | 10/1997 |
| JP | 2001-131343 A | 5/2001 |
| JP | 2001-131344 A | 5/2001 |
| JP | 2001131344 A * | 5/2001 |
| JP | 2003-155302 A | 5/2003 |
| JP | 2005-1710341 A | 6/2005 |
| JP | 2005-232351 A | 9/2005 |
| WO | 87/05610 A1 | 9/1987 |
| WO | 03/087171 A1 | 10/2003 |
| WO | WO 2004011545 A1 * | 2/2004 |
| WO | 2004/087802 A1 | 10/2004 |

OTHER PUBLICATIONS

Translation of JP 07-053784, Feb. 1995.*
Translation of JP 2001-131344, May 2001.*
Translation of JP 09-278844, Oct. 1997.*
Office Action issued on Oct. 20, 2011 from the People's Republic of China Patent Office in a counterpart Chinese Application No. 200680034024.2.
Office Action issued on Jan. 24, 2012 from the Japanese Patent Office in a counterpart Japanese Application No. 2005-268386.
Office Action dated Apr. 18, 2012 from the People Republic of China in a counterpart Chinese Application No. 200680034024.2.
Office Action issued on Oct. 8, 2012 from the People's Republic of China Patent Office in a counterpart Chinese Application No. 200680034024.2.
Japanese Office Action issued on Oct. 16, 2012 in Japanese Application No. 2005-268386.

* cited by examiner

*Primary Examiner* — Hui Chin
(74) *Attorney, Agent, or Firm* — Sughrue Mion, PLLC

(57) ABSTRACT

This invention provides a rubber composition having excellent workability, fracture characteristics and wear resistance and low heat buildup, which comprises not less than 20 parts by mass of a reinforcing filler (B) and 5 to 60 parts by mass of a modified aromatic vinyl compound-conjugated diene compound copolymer (C) having at least one functional group, an aromatic vinyl compound content of 5 to 80% by mass, a vinyl bond content in a conjugated diene compound portion of 10 to 80% by mass and a weight average molecular weight as measured through a gel permeation chromatography and converted to polystyrene of 5,000 to 500,000 based on 100 parts by mass of a rubber component (A) containing not less than 10% by mass of a modified conjugated diene-based polymer having at least one functional group.

30 Claims, No Drawings

RUBBER COMPOSITION AND TIRE USING THE SAME

TECHNICAL FIELD

This invention relates to a rubber composition and a tire using the rubber composition, and more particularly to a rubber composition having a high filler dispersibility, excellent workability, fracture characteristics and wear resistance and a low heat buildup.

BACKGROUND ART

Lately, it is further severely demanded to reduce a fuel consumption of an automobile in connection with a worldwide effluent control of carbon dioxide associated with a growing interest in environmental problems. In order to cope with such a demand, it is demanded to reduce a rolling resistance as a tire performance. As a means for reducing the rolling resistance of the tire, there has hitherto been examined a method of optimizing the tire structure, but it is most generally attempted to use a rubber composition having a low heat buildup as a rubber composition applied to the tire at the present.

As a means for obtaining such a rubber composition having a low heat buildup, there are considered the decrease in an amount of a filler such as carbon black, silica or the like, the use of carbon black having a large particle size and the like. In any cases, however, there can not be avoided the deterioration of the reinforcing property, wear resistance and grip performance on a wet road surface of the rubber composition.

As another means for obtaining the rubber composition having the low heat buildup, there are developed many techniques of improving the dispersibility of the filler in the rubber composition. Among them is most effective a method wherein a polymerization active site of a conjugated diene-based polymer obtained through an anionic polymerization with an alkyl lithium is modified by a functional group interactive with a filler.

For example, there are known a method wherein carbon black is used as a filler and a modified conjugated diene-based polymer formed by modifying a polymerization active site with a tin compound is used as a rubber component (see JP-B-H05-87530), a method wherein carbon black is used as a filler and a modified conjugated diene-based polymer formed by modifying both polymerization active terminals with a tin compound is used as a rubber component (see JP-A-H06-49279), a method wherein carbon black is used as a filler and a modified conjugated diene-based polymer formed by introducing an amino group into a polymerization active terminal is used (e.g. see JP-A-S62-207342, JP-A-H06-199923, JP-A-H08-231658 and JP-A-H08-225604) and so on.

However, when the modified conjugated diene-based polymer is used as a rubber component, if a large amount of a softening agent, particularly aromatic oil is compounded, the effect of improving the dispersibility of the filler is not sufficiently developed and there is a problem that the workability, low heat buildup, fracture characteristics and wear resistance of the rubber composition cannot be sufficiently improved.

DISCLOSURE OF THE INVENTION

It is, therefore, an object of the invention to solve the above-mentioned problems of the conventional techniques and to provide a rubber composition having excellent workability, fracture characteristics and wear resistance and a low heat buildup, wherein the modified conjugated diene-based polymer is used as a rubber component and a specified substance being less in an ingredient obstructing the effect of improving the dispersibility of the filler is compounded instead of the softening agent such as aromatic oil or the like.

The inventors have made various studies in order to achieve the above object and discovered that in the rubber composition using the modified conjugated diene-based polymer as the rubber component, the effect of improving the dispersibility of the filler through the modified conjugated diene-based polymer can be sufficiently developed to highly improve the workability, fracture characteristics, wear resistance and low heat buildup of the rubber composition by using a liquid low-molecular weight aromatic vinyl compound-conjugated diene compound copolymer having at least one functional group instead of the softening agent such as aromatic oil or the like, and as a result the invention has been accomplished.

That is, the rubber composition according to the invention comprises not less than 20 parts by mass of a reinforcing filler (B) and 5 to 60 parts by mass of a modified aromatic vinyl compound-conjugated diene compound copolymer (C) having at least one functional group, an aromatic vinyl compound content of 5 to 80% by mass, a vinyl bond content in a conjugated diene compound portion of 10 to 80% by mass and a weight average molecular weight as measured through a gel permeation chromatography and converted to polystyrene of 5,000 to 500,000 based on 100 parts by mass of a rubber component (A) containing not less than 10% by mass of a modified conjugated diene-based polymer having at least one functional group.

In the rubber composition according to the invention, as an aromatic vinyl compound in the modified aromatic vinyl compound-conjugated diene compound copolymer (C) is preferable styrene, and as a conjugated diene compound in the copolymer (C) is preferable butadiene, and as the copolymer (C) is preferable a solution-polymerized styrene-butadiene copolymer rubber.

In the rubber composition according to the invention, the modified aromatic vinyl compound-conjugated diene compound copolymer (C) preferably has a weight average molecular weight as measured with a gel permeation chromatography and converted to polystyrene of 20,000 to 400,000, more preferably 50,000 to 400,000.

In the rubber composition according to the invention, a weight average molecular weight of the modified aromatic vinyl compound-conjugated diene compound copolymer (C) prior to the introduction of the functional group is preferably 5,000 to 300,000, more preferably 20,000 to 200,000, even more preferably 50,000 to 150,000 as measured through a gel permeation chromatography and converted to polystyrene.

In the rubber composition according to the invention, the modified aromatic vinyl compound-conjugated diene compound copolymer (C) is preferable to have a weight average molecular weight lower than that of the modified conjugated diene-based polymer.

In another preferable embodiment of the rubber composition according to the invention, the functional group of the modified aromatic vinyl compound-conjugated diene compound copolymer (C) has an affinity for the reinforcing filler (B).

In a further preferable embodiment of the rubber composition according to the invention, the functional group of the modified aromatic vinyl compound-conjugated diene compound copolymer (C) is a nitrogen-containing functional group. Moreover, as the nitrogen-containing functional group are preferable substituted and unsubstituted amino groups, amide group, imino group, imidazole group, nitrile group, isocyanate group and pyridyl group. Also, the nitrogen-containing functional group is preferable to be selected from the group consisting of a substituted amino group represented by the following formula (I):

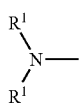
(I)

(wherein R¹ is independently an alkyl group having a carbon number of 1-12, a cycloalkyl group or an aralkyl group) and a cyclic amino group represented by the following formula (II):

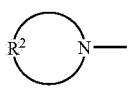
(II)

(wherein R² is an alkylene group having 3-16 methylene groups, a substituted alkylene group, an oxyalkylene group or a N-alkylamino-alkylene group).

In the other preferable embodiment of the rubber composition according to the invention, the modified aromatic vinyl compound-conjugated diene compound copolymer (C) is obtained by reacting an active terminal of an aromatic vinyl compound-conjugated diene compound copolymer having an active terminal with at least one selected from the group consisting of a hydrocarbyloxy silane compound represented by the following formula (III):

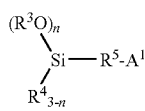
(III)

(wherein A¹ is a monovalent group having at least one functional group selected from (thio)epoxy, (thio)isocyanate, (thio)ketone, (thio)aldehyde, imine, amide, isocyanuric acid triester, (thio)carboxylic acid hydrocarbylester, a metal salt of (thio)carboxylic acid, carboxylic anhydride, a halide of carboxylic acid and carbonic acid dihydrocarbylester; R³ and R⁴ are independently a monovalent aliphatic hydrocarbon group having a carbon number of 1-20 or a monovalent aromatic hydrocarbon group having a carbon number of 6-18; R⁵ is a single bond or a divalent inactive hydrocarbon group having a carbon number of 1-20; n is an integer of 1-3; when plural OR³s are existent, they may be same or different; and active proton and onium salt are not included in the molecule), and a hydrocarbyloxy silane compound represented by the following formula (IV):

$R^6_p-Si-(OR^7)_{4-p}$ (IV)

(wherein R⁶ and R⁷ are independently a monovalent aliphatic hydrocarbon group having a carbon number of 1-20 or a monovalent aromatic hydrocarbon group having a carbon number of 6-18; p is an integer of 0-2; when plural OR⁷s are existent, they may be same or different; and active proton and onium salt are not included in the molecule).

In a further preferable embodiment of the rubber composition according to the invention, the modified aromatic vinyl compound-conjugated diene compound copolymer (C) has at least one tin-carbon bond or silicon-carbon bond derived from a coupling agent represented by the following formula (V):

$R^8_aZX_b$ (V)

(wherein R⁸ is independently selected from the group consisting of an alkyl group having a carbon number of 1-20, a cycloalkyl group having a carbon number of 3-20, an aryl group having a carbon number of 6-20 and an aralkyl group having a carbon number of 7-20; Z is tin or silicon; X is independently chlorine or bromine; and a is 0-3 and b is 1-4 provided that a+b=4).

In another preferable embodiment of the rubber composition according to the invention, an amount of the modified aromatic vinyl compound-conjugated diene compound copolymer (C) compounded is not less than 20 parts by mass based on 100 parts by mass of the rubber component (A).

In the other preferable embodiment of the rubber composition according to the invention, the reinforcing filler (B) is carbon black and/or silica. In the rubber composition according to the invention, the amount of carbon black compounded is preferably not less than 50 parts by mass based on 100 parts by mass of the rubber component (A). Also, in the rubber composition according to the invention, the amount of silica compounded is preferably not less than 50 parts by mass based on 100 parts by mass of the rubber component (A).

In a further preferable embodiment of the rubber composition according to the invention, the modified conjugated diene-based polymer in the rubber component (A) is a copolymer of 1,3-butadiene and an aromatic vinyl compound or a homopolymer of 1,3-butadiene. Moreover, as the aromatic vinyl compound is preferable styrene.

In another preferable embodiment of the rubber composition according to the invention, the modified conjugated diene-based polymer in the rubber component (A) has a glass transition point (Tg) of not higher than 0° C.

In the other preferable embodiment of the rubber composition according to the invention, the modified conjugated diene-based polymer in the rubber component (A) is formed through a polymerization using an organic alkaline metal compound or a rare-earth metal compound. Moreover, as the organic alkaline metal compound is preferable an alkyl lithium.

In a further preferable embodiment of the rubber composition according to the invention, the functional group of the modified conjugated diene-based polymer in the rubber component (A) has an affinity for the reinforcing filler (B).

In another preferable embodiment of the rubber composition according to the invention, the functional group of the modified conjugated diene-based polymer in the rubber component (A) is a nitrogen-containing functional group. Moreover, as the nitrogen-containing functional group are preferable substituted and non-substituted amino groups, amide group, imino group, imidazole group, nitrile group and pyridyl group. Also, the nitrogen-containing functional group is preferable to be selected from the group consisting of a substituted amino group represented by the following formula (I):

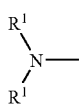
(I)

(wherein R¹ is independently an alkyl group having a carbon number of 1-12, a cycloalkyl group or an aralkyl group) and a cyclic amino group represented by the following formula (II):

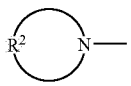

(II)

(wherein $R^2$ is an alkylene group having 3-16 methylene groups, a substituted alkylene group, an oxyalkylene group or a N-alkylamino-alkylene group).

In the other preferable embodiment of the rubber composition according to the invention, the modified conjugated diene-based polymer in the rubber component (A) is obtained by reacting an active terminal of a conjugated diene-based polymer having an active terminal with at least one selected from the group consisting of a hydrocarbyloxy silane compound represented by the following formula (III):

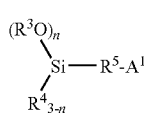

(III)

[wherein $A^1$ is a monovalent group having at least one functional group selected from (thio)epoxy, (thio)isocyanate, (thio)ketone, (thio)aldehyde, imine, amide, isocyanuric acid triester, (thio)carboxylic acid hydrocarbylester, a metal salt of (thio)carboxylic acid, carboxylic anhydride, a halide of carboxylic acid and carbonic acid dihydrocarbylester; $R^3$ and $R^4$ are independently a monovalent aliphatic hydrocarbon group having a carbon number of 1-20 or a monovalent aromatic hydrocarbon group having a carbon number of 6-18; $R^5$ is a single bond or a bivalent inactive hydrocarbon group having a carbon number of 1-20; n is an integer of 1-3; when plural $OR^3$s are existent, they may be same or different; and active proton and onium salt are not included in the molecule] and a hydrocarbyloxy silane compound represented by the following formula (IV):

$$R^6_p\text{—Si—}(OR^7)_{4-p}$$ (IV)

[wherein $R^6$ and $R^7$ are independently a monovalent aliphatic hydrocarbon group having a carbon number of 1-20 or a monovalent aromatic hydrocarbon group having a carbon number of 6-18; p is an integer of 0-2; when plural $OR^7$s are existent, they may be same or different; and active proton and onium salt are not included in the molecule].

In a further preferable embodiment of the rubber composition according to the invention, the modified conjugated diene-based polymer in the rubber component (A) has at least one tin-carbon bond or silicon-carbon bond derived from a coupling agent represented by the following formula (V):

$$R^8_a Z X_b$$ (V)

[wherein $R^8$ is independently selected from the group consisting of an alkyl group having a carbon number of 1-20, a cycloalkyl group having a carbon number of 3-20, an aryl group having a carbon number of 6-20 and an aralkyl group having a carbon number of 7-20; Z is tin or silicon; X is independently chlorine or bromine; and a is 0-3 and b is 1-4 provided that a+b=4].

In a still further preferable embodiment of the rubber composition according to the invention, the rubber component (A) contains natural rubber and/or polyisoprene rubber.

Also, the tire according to the invention is characterized by using the above rubber composition.

According to the invention, there can be provided a rubber composition having a high dispersibility of a reinforcing filler (B) and excellent workability, fracture characteristics and wear resistance, and a low heat buildup by using a modified conjugated diene-based polymer as a rubber component (A) and a low-molecular weight modified aromatic vinyl compound-conjugated diene compound copolymer (C) instead of a softening agent such as aromatic oil or the like. Also, there can be provided a tire using such a rubber composition.

BEST MODE FOR CARRYING OUT THE INVENTION

The invention will be described in detail below. The rubber composition according to the invention comprises not less than 20 parts by mass of a reinforcing filler (B) and 5 to 60 parts by mass of a modified aromatic vinyl compound-conjugated diene compound copolymer (C) having at least one functional group, an aromatic vinyl compound content of 5 to 80% by mass, a vinyl bond content in a conjugated diene compound portion of 10 to 80% by mass and a weight average molecular weight as measured through a gel permeation chromatography and converted to polystyrene of 5,000 to 500,000 based on 100 parts by mass of a rubber component (A) containing not less than 10% by mass of a modified conjugated diene-based polymer having at least one functional group.

Since the softening agent conventionally used such as an aromatic oil or the like is relatively high in the polarity, it has a high affinity for the modified conjugated diene-based polymer having the functional group. As a result, the modified conjugated diene-based polymer is trapped by the softening agent such as the aromatic oil or the like during the milling of the rubber composition, whereby the effect of improving the dispersibility of the reinforcing filler (B) is diminished. On the contrary, the low-molecular weight modified aromatic vinyl compound-conjugated diene compound copolymer (C) used in the invention does not trap the modified conjugated diene-based polymer in the rubber component (A) during the milling. Further, since the molecular weight of the modified conjugated diene-based polymer in the rubber component (A) is different from that of the low-molecular weight modified aromatic vinyl compound-conjugated diene compound copolymer (C), they do not interfere with the effect thereof each other and develop a synergistic effect. That is, the functional group of the low-molecular weight modified aromatic vinyl compound-conjugated diene compound copolymer (C) improves the dispersibility of the reinforcing filler, while the functional group of the modified conjugated diene-based polymer in the rubber component (A) is attached as a bound rubber to the filler when the surface area of the dispersed filler is increased, and hence the low heat buildup and wear resistance can be significantly improved.

The rubber component (A) in the rubber composition according to the invention contains not less than 10% by mass of the modified conjugated diene-based polymer having at least one functional group. The modified conjugated diene-based polymer is not particularly limited as long as it has one or more functional groups. As the functional group is preferable a functional group having an affinity for the reinforcing filler (B), and a nitrogen-containing functional group, a silicon-containing functional group and a tin-containing functional group are more preferable. When the functional group of the modified conjugated diene-based polymer has the affinity for the reinforcing filler (B), the dispersibility of the reinforcing filler (B) in the rubber composition is improved and the workability, fracture characteristics, wear resistance and low heat buildup of the rubber composition are surely improved. As the modified conjugated diene-based polymer is preferable, for example, one formed by modifying an active terminal of a conjugated diene-based polymer having the active terminal with a modifying agent. The conjugated diene-based polymer is not particularly limited as long as it has the active terminal, and may include one formed through an anionic polymerization or a coordination polymerization. Also, as the conjugated diene-based polymer are preferable a copolymer of a conjugated diene compound and an aromatic vinyl compound and a homopolymer of a conjugated diene compound, and a copolymer of 1,3-butadiene and an aromatic vinyl compound and a homopolymer of 1,3-butadiene are particularly preferable.

The conjugated diene compound as a monomer includes 1,3-butadiene, isoprene, 1,3-pentadiene, 2,3-dimethylbutadiene, 2-phenyl-1,3-butadiene, 1,3-hexadiene and so on. Among them, 1,3-butadiene is particularly preferable. These conjugated diene compounds may be used alone or in a combination of two or more. On the other hand, the aromatic vinyl compound as a monomer includes styrene, α-methylstyrene, 1-vinylnaphthalene, 3-vinyltoluene, ethylvinylbenzene, divinylbenzene, 4-cyclohexylstyrene, 2,4,6-trimethylstyrene and so on. Among them, styrene is preferable. These aromatic vinyl compounds may be used alone or in a combination of two or more.

When the conjugated diene-based polymer having the active terminal is produced through the anionic polymerization, as a polymerization initiator is preferably used an organic alkaline metal compound, and more preferably a lithium compound. As the lithium compound are mentioned a hydrocarbyl lithium, a lithium amide compound and so on. When the hydrocarbyl lithium is used as the polymerization initiator, there is obtained a conjugated diene-based polymer having a hydrocarbyl group at a polymerization starting terminal and a polymerization active site at another terminal. On the other hand, when the lithium amide compound is used as the polymerization initiator, there is obtained a conjugated diene-based polymer having a nitrogen-containing functional group at a polymerization starting terminal and a polymerization active site at another terminal, which can be used as the modified conjugated diene-based polymer in the invention without being modified with the modifying agent. Moreover, the amount of the lithium compound used as the polymerization initiator is preferably within a range of 0.2 to 20 mmol per 100 g of the monomer.

As the hydrocarbyl lithium are mentioned ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium and so on. Among them, alkyl lithiums such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

On the other hand, as the lithium amide compound are mentioned lithium hexamethylene imide, lithium pyrrolidide, lithium piperidide, lithium heptamethylene imide, lithium dodecamethylene imide, lithium dimethyl amide, lithium diethyl amide, lithium dipropyl amide, lithium dibutyl amide, lithium dihexyl amide, lithium diheptyl amide, lithium dioctyl amide, lithium di-2-ethylhexyl amide, lithium didecyl amide, lithium-N-methyl piperazide, lithium ethyl propyl amide, lithium ethyl butyl amide, lithium methyl butyl amide, lithium ethyl benzyl amide, lithium methyl phenethyl amide and so on.

The modified conjugated diene-based polymer introduced with at least one nitrogen-containing functional group selected from the group consisting of the substituted amino group represented by the formula (I) and the cyclic amino group represented by the formula (II) can be obtained by using a lithium amide compound represented by the formula: Li-AM [wherein AM is the substituted amino group represented by the formula (I) or the cyclic amino group represented by the formula (II)] as the lithium amide compound.

In the formula (I), $R^1$ is an alkyl group having a carbon number of 1-12, a cycloalkyl group or an aralkyl group, and concretely includes methyl group, ethyl group, butyl group, octyl group, cyclohexyl group, 3-phenyl-1-propyl group, isobutyl group and so on. Moreover, $R^1$s may be same or different.

In the formula (II), $R^2$ is an alkylene group having 3-16 methylene groups, a substituted alkylene group, an oxyalkylene group or a N-alkylamino-alkylene group. At this moment, the substituted alkylene group includes monosubstituted to octasubstituted alkylene groups. As a substituent are mentioned a linear or branched alkyl group having a carbon number of 1-12, a cycloalkyl group, a bicycloalkyl group, an aryl group and an aralkyl group. As $R^2$ are concretely preferable trimethylene group, tetramethylene group, hexamethylene group, oxydiethylene group, N-alkylazadiethylene group, dodecamethylene group, hexadecamethylene group and the like.

The lithium amide compound may be previously prepared from a secondary amine and a lithium compound and used for the polymerization reaction, or may be produced in the polymerization system. As the secondary amine are mentioned dimethyl amine, diethyl amine, dibutyl amine, dioctyl amine, dicyclohexyl amine, diisobutyl amine and the like, as well as cyclic amines such as azacycloheptane (i.e., hexamethylene imine), 2-(2-ethylhexyl)pyrrolidine, 3-(2-propyl)pyrrolidine, 3,5-bis(2-ethylhexyl)piperidine, 4-phenyl piperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadec-9-ene, 3-isobutyl-1-azacyclododecane, 2-methyl-7-t-butyl-1-azacyclododecane, 5-nonyl-1-azacyclododecane, 8-(4'-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane, 1,5,5-trimethyl-3-azabicyclo[4.4.0]decane and the like. On the other hand, as the lithium compound may be used the above-described hydrocarbyl lithium.

The method for producing the conjugated diene-based polymer through the anionic polymerization using as the polymerization initiator the organic alkaline metal compound or the like is not particularly limited. For example, the conjugated diene-based polymer can be produced by polymerizing the conjugated diene compound alone or a mixture of the conjugated diene compound and aromatic vinyl compound in a hydrocarbon solvent inactive to the polymerization reaction. As the hydrocarbon solvent inactive to the polymerization reaction are mentioned propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and so on. They may be used alone or in a combination of two or more.

The anionic polymerization may be carried out in the presence of a randomizer. The randomizer can control the microstructure of the conjugated diene compound, and has an action that 1,2-bond content in butadiene unit of the polymer using, for example, butadiene as a monomer is controlled, and butadiene unit and styrene unit in the copolymer using butadiene and styrene as a monomer are randomized, or the like. As the randomizer are mentioned dimethoxybenzene, tetrahydrofuran, dimethoxyethane, diethylene glycol dibutyl ether, diethylene glycol dimethyl ether, bistetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalent per 1 mol of the organic alkaline metal compound as a polymerization initiator.

The anionic polymerization may be carried out through any of solution polymerization, vapor phase polymerization and bulk polymerization. In the solution polymerization, the concentration of the monomer in the solution is preferably within a range of 5 to 50% by mass, more preferably 10 to 30% by mass. When the conjugated diene compound and aromatic vinyl compound are used together as a monomer, the content of the aromatic vinyl compound in the monomer mixture is preferably within a range of 3 to 50% by mass, more preferably 4 to 45% by mass. Also, the polymerization system is not particularly limited and may be a batch system or a continuous system.

The polymerization temperature in the anionic polymerization is preferably within a range of 0 to 150° C., more preferably 20 to 130° C. Also, such a polymerization may be carried out under a generating pressure, but it is preferable to be usually conducted under a pressure enough to keep the monomers used at substantially a liquid phase. When the polymerization reaction is carried out under a pressure higher than the generating pressure, the reaction system is preferable to be pressurized with an inert gas. Moreover, the starting materials used in the polymerization such as monomers, polymerization initiator, solvent and the like are preferable to be used after the reaction obstructing substances such as water, oxygen, carbon dioxide, protonic compound and the like are previously removed.

On the other hand, when the conjugated diene-based polymer having the active terminal is produced through the coordination polymerization, as the polymerization initiator is preferably used a rare-earth metal compound, more preferably a combination of the following ingredients (a), (b) and (c).

The ingredient (a) used in the coordination polymerization is selected from the rare-earth metal compound, a complex compound of the rare-earth metal compound and a Lewis base, and so on. As the rare-earth metal compound are mentioned carboxylate, alkoxide, β-diketone complex, phosphate, phosphite and the like of the rare-earth element. As the Lewis base are mentioned acetylacetone, tetrahydrofuran, pyridine, N,N-dimethylformamide, thiophene, diphenyl ether, triethylamine, organophosphorus compound, monohydric or dihydric alcohol and so on. As the rare-earth element of the rare-earth metal compound are preferable lanthanum, neodymium, praseodymium, samarium and gadolinium. Among them, neodymium is particularly preferable. Also, as the ingredient (a) are concretely mentioned neodymium tri-2-ethylhexanoate and a complex compound with acetylacetone thereof, neodymium trineodecanoate and a complex compound with acetylacetone thereof, neodymium tri-n-butoxide and so on. These ingredients (a) may be used alone or in a combination of two or more.

The ingredient (b) used in the coordination polymerization is selected from organoaluminum compounds. As the organoaluminum compound are concretely mentioned a trihydrocarbyl aluminum represented by the formula: $R^9_3Al$, a hydrocarbyl aluminum hydride represented by the formula: $R^9_2AlH$ or $R^9AlH_2$ (wherein $R^9$ is independently a hydrocarbon group having a carbon number of 1-30), a hydrocarbyl aluminoxane with a hydrocarbon group having a carbon number of 1-30 and so on. As the organoaluminum compound are concretely mentioned trialkyl aluminum, dialkyl aluminum hydride, alkyl aluminum dihydride, alkyl aluminoxane and so on. These compounds may be used alone or in a combination of two or more. Moreover, as the ingredient (b) is preferably used a combination of the aluminoxane and another organoaluminum compound.

The ingredient (c) used in the coordination polymerization is selected from a hydrolyzable halogen-containing compound or a complex compound with the Lewis base thereof; organohalogen compounds having a tertiary alkyl halide, benzyl halide or allyl halide; ionic compounds composed of a non-coordinative anion and a counter cation; and so on. As the ingredient (c) are concretely mentioned alkylaluminum dichloride, dialkylaluminum chloride, silicon tetrachloride, tin tetrachloride, a complex of zinc chloride and a Lewis base such as alcohol or the like, a complex of magnesium chloride and a Lewis base such as alcohol or the like, benzyl chloride, t-butyl chloride, benzyl bromide, t-butyl bromide, triphenyl carbonium tetrakis(pentafluorophenyl)borate and so on. These ingredients (c) may be used alone or in a combination of two or more.

The polymerization initiator may be previously prepared by using the above-described ingredients (a), (b) and (c), and if necessary the same conjugated diene compound as the monomer for the polymerization and/or an unconjugated diene compound. Moreover, it may be used by supporting a part or whole of the ingredient (a) or (c) on an inactive solid. The amount of each ingredient used may be properly set, but the amount of the ingredient (a) is typically 0.001 to 0.5 mmol per 100 g of the monomer. Also, a molar ratio of the ingredient (b)/ingredient (a) is preferably 5 to 1000, and a molar ratio of the ingredient (c)/ingredient (a) is preferably 0.5 to 10.

The polymerization temperature in the coordination polymerization is preferably within a range of −80 to 150° C., more preferably −20 to 120° C. As the solvent used in the coordination polymerization may be used the hydrocarbon solvent inactive to the reaction as mentioned in the anionic polymerization. Also, the concentration of the monomer in the reaction solution is the same as in the case of the anionic polymerization. Moreover, the reaction pressure in the coordination polymerization is the same as in the anionic polymerization, and the starting materials used in the reaction are also preferable to be ones from which the reaction obstructing substances such as water, oxygen, carbon dioxide, protonic compound and the like are substantially removed.

When the active terminal in the conjugated diene-based polymer having the active terminal is modified with the modifying agent, as the modifying agent may be used nitrogen-containing compounds, silicon-containing compounds, tin-containing compounds and so on.

As the nitrogen-containing compound usable as the modifying agent are mentioned bis(diethylamino)benzophenone, dimethylimidazolidinone, N-methylpyrrolidone, 4-dimethylaminobenzylidene aniline and so on. By using these nitrogen-containing compounds as the modifying agent, the nitrogen-containing functional group such as the substituted and unsubstituted amino group, amide group, imino group, imidazole group, nitrile group, isocyanate group and pyridyl group and the like can be introduced into the conjugated diene-based polymer.

Also, as the silicon-containing compound usable as the modifying agent is preferable a hydrocarbyloxy silane compound, and the hydrocarbyloxy silane compound represented by the formula (III) or (IV) is more preferable.

In the functional group of $A^1$ of the formula (III), imine includes ketimine, aldimine and amidine, and (thio)carboxylic acid ester includes an unsaturated carboxylate ester such as acrylate, methacrylate or the like. Moreover, as a metal of a metal salt of (thio)carboxylic acid may be mentioned an alkali metal, an alkaline earth metal, Al, Sn, Zn and the like.

As $R^3$ and $R^4$ are mentioned an alkyl group having a carbon number of 1-20, an alkenyl group having a carbon number of 2-18, an aryl group having a carbon number of 6-18, an aralkyl group having a carbon number of 7-18 and the like. In this case, the alkyl group and alkenyl group may be straight, branched or cyclic, and include, for example, methyl group, ethyl group, n-propyl group, isopropyl group, n-butyl group, isobutyl group, sec-butyl group, tert-butyl group, pentyl group, hexyl group, octyl group, decyl group, dodecyl group, cyclopentyl group, cyclohexyl group, vinyl group, propenyl group, allyl group, hexenyl group, octenyl group, cyclopentenyl group, cyclohexenyl group and the like. Also, the aryl group may have a substituent on the aromatic ring such as lower alkyl group or the like, and includes, for example, phenyl group, tolyl group, xylyl group, naphthyl group and the like. Further, the aralkyl group may have a substituent on the aromatic ring such as lower alkyl group or the like, and includes, for example, benzyl group, phenethyl group, naphthylmethyl group and the like.

As the divalent inert hydrocarbon group having a carbon number of 1-20 in $R^5$ is preferable an alkylene group having a carbon number of 1-20. The alkylene group may be straight, branched or cyclic, but the straight chain is particularly preferable. As the straight alkylene group are mentioned methylene group, ethylene group, trimethylene group, tetramethylene group, pentamethylene group, hexamethylene group, octamethylene group, decamethylene group, dodecamethylene group and the like.

Moreover, n is an integer of 1-3, preferably 3. When n is 2 or 3, each of $R^3$Os may be same or different.

In the hydrocarbyloxy silane compound represented by the formula (III), as the (thio)epoxy group-containing hydrocarbyloxysilane compound may be mentioned, for example, 2-glycidoxyethyl trimethoxysilane, 2-glycidoxyethyl triethoxysilane, (2-glycidoxyethyl)methyl dimethoxysilane, 3-glycidoxypropyl trimethoxysilane, 3-glycidoxypropyl triethoxysilane, (3-glycidoxypropyl)methyl dimethoxysilane, 2-(3,4-epoxycyclohexyl)ethyl trimethoxysilane, 2-(3,4-epoxycyclohexyl)ethyl triethoxysilane, 2-(3,4-epoxycyclohexyl)ethyl (methyl) dimethoxysilane and ones obtained by replacing the epoxy group in these compounds with a thioepoxy group. Among them, 3-glycidoxypropyl trimethoxysilane and 3-glycidoxypropyl triethoxysilane are particularly preferable.

As the imine group-containing hydrocarbyloxy silane compound may be mentioned N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine as well as trimethoxysilyl compounds, methyldiethoxysilyl compounds, ethyldiethoxysilyl compounds, methyldimethoxysilyl compounds, ethyldimethoxysilyl compounds and the like corresponding to these triethoxysilyl compounds. Among them, N-(1-methylpropylidene)-3-(triethoxysilyl)-1-propaneamine and N-(1,3-dimethylbutylidene)-3-(triethoxysilyl)-1-propaneamine are particularly preferable.

As the imine(amidine) group-containing compound are mentioned 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole and the like. Among them, N-(3-triethoxysilylpropyl)-4,5-dihydroimidazole is preferable.

Furthermore, other hydrocarbyloxy silane compounds includes the following ones. That is, as the carboxylate ester group-containing compound are mentioned 3-methacryloyloxypropyl triethoxysilane, 3-methacryloyloxypropyl trimethoxysilane, 3-methacryloyloxypropyl methyldiethoxysilane, 3-methacryloyloxypropyl triisopropoxysilane and the like. Among them, 3-methacryloyloxypropyl trimethoxysilane is preferable.

As the isocyanate group-containing compound are mentioned 3-isocyanatopropyl trimethoxysilane, 3-isocyanatopropyl triethoxysilane, 3-isocyanatopropyl methyldiethoxysilane, 3-isocyanatopropyl triisopropoxysilane and the like. Among them, 3-isocyanatopropyl triethoxysilane is preferable.

As the carboxylic anhydride-containing compound are mentioned 3-triethoxysilylpropyl succinic anhydride, 3-trimethoxysilylpropyl succinic anhydride, 3-methyldiethoxysilylpropyl succinic anhydride and the like. Among them, 3-triethoxysilylpropyl succinic anhydride is preferable.

On the other hand, $R^6$ and $R^7$ in the formula (IV) are the same as mentioned on $R^3$ and $R^4$ in the formula (III), respectively.

As the hydrocarbyloxysilane compound represented by the formula (IV) are mentioned, for example, tetramethoxy silane, tetraethoxy silane, tetra-n-propoxy silane, tetraisopropoxy silane, tetra-n-butoxy silane, tetraisobutoxy silane, tetra-sec-butoxy silane, tetra-tert-butoxy silane, methyltrimethoxy silane, methyltriethoxy silane, methyltripropoxy silane, methyltriisopropoxy silane, ethyltrimethoxy silane, ethyltriethoxy silane, propyltriethoxy silane, butyltrimethoxy silane, phenyltrimethoxy silane, phenyltriethoxy silane, dimethyldimethoxy silane, methylphenyldimethoxy silane, vinyltrimethoxy silane, vinyltriethoxy silane, divinyldimethoxy silane, divinyldiethoxy silane and the like. Among them, tetraethoxy silane is particularly preferable.

The hydrocarbyloxysilane compounds may be used alone or in a combination of two or more. Also, a partial condensate of the hydrocarbyloxysilane compound may be used.

As the modifying agent is also preferable a coupling agent represented by the formula (V). The conjugated diene-based polymer modified with the coupling agent of the formula (V) has at least one of tin-carbon bond and silicon-carbon bond. In the formula (V), $R^8$ is independently an alkyl group having a carbon number of 1-20, a cycloalkyl group having a carbon number of 3-20, an aryl group having a carbon number of 6-20 or an aralkyl group having a carbon number of 7-20. As $R^8$ are concretely mentioned methyl group, ethyl group, n-butyl group, neophyl group, cyclohexyl group, n-octyl group, 2-ethylhexyl group and the like. Also, Z is tin or silicon, and X is independently chlorine or bromine. In the formula (V), a is an integer of 0-3, and b is an integer of 1-4, provided that a+b=4. As the coupling agent of the formula (V) are preferable tin teterachloride, $R^8SnCl_3$, $R^8_2SnCl_2$, $R^8_3SnCl$ and the like, and tin teterachloride is particularly preferable.

The modification reaction with the above modifying agent is preferable to be carried out by a solution reaction. In such a solution may be included the monomer used in the polymerization. Also, the reaction system of the modification reaction is not particularly limited and may be a batch system or a continuous system. Further, the reaction temperature of the modification reaction is not particularly limited as long as the reaction proceeds, and the reaction temperature in the polymerization reaction may be adopted as it is. The amount of the modifying agent used is preferably within a range of 0.25 to 3.0 mol, more preferably 0.5 to 1.5 mol per 1 mol of the polymerization initiator used for producing the conjugated diene-based polymer.

The modified conjugated diene-based polymer in the rubber component (A) is preferable to have a glass transition point (Tg) of not higher than 0° C. as measured by a differential scanning calorimeter (DSC). When the glass transition point of the modified conjugated diene-based polymer exceeds 0° C., the low heat buildup and characteristics at low temperature of the rubber composition tend to be deteriorated.

The rubber composition of the invention comprises the above-mentioned modified conjugated diene-based polymer as the rubber component (A). Moreover, the content of the modified conjugated diene-based polymer in the rubber component (A) is not less than 10% by mass. When the content of the modified conjugated diene-based polymer in the rubber component (A) is less than 10% by mass, the effect of improving the dispersibility of the reinforcing filler (B) is small and the effects of improving the workability, low heat buildup, fracture characteristics and wear resistance of the rubber composition are also small. Moreover, in the rubber composition of the invention, as the rubber component (A) other than the modified conjugated diene-based polymer may be used natural rubber (NR), but also unmodified styrene-butadiene copolymer (SBR), polybutadiene rubber (BR), polyisoprene rubber (IR), butyl rubber (IIR), ethylene-propylene copolymer and the like. Among them, natural rubber and polyisoprene rubber are preferable. These rubber components may be used alone or in a blend of two or more.

The rubber composition according to the invention comprises not less than 20 parts by mass of the reinforcing filler (B) based on 100 parts by mass of the rubber component (A). As the reinforcing filler (B) are preferable carbon black and silica. When the amount of the reinforcing filler (B) compounded is less than 20 parts by mass based on 100 parts by mass of the rubber component (A), the fracture characteristics and wear resistance of the rubber composition are deteriorated. In the rubber composition according to the invention, the amount of carbon black compounded is preferably not less than 50 parts by mass based on 100 parts by mass of the rubber component (A). Also, in the rubber composition according to the invention, the amount of silica compounded is preferably not less than 50 parts by mass based on 100 parts by mass of the rubber component (A). When the amount of carbon black or silica compounded is not less than 50 parts by mass, the fracture characteristics and wear resistance of the rubber composition can be sufficiently ensured. As the carbon black are preferable FEF, SRF, HAF, ISAF and SAF grade carbon blacks, and HAF, ISAF and SAF grade carbon blacks are more preferable. On the other hand, as the silica are preferable precipitated silica, fumed silica and the like, and the precipitated silica is more preferable.

The rubber composition according to the invention comprises 5 to 60 parts by mass, preferably 15 to 60 parts by mass, more preferably 20 to 60 parts by mass of the modified aromatic vinyl compound-conjugated diene compound copolymer (C) having at least one functional group, an aromatic vinyl compound content of 5 to 80% by mass, a vinyl bond content in a conjugated diene compound portion of 10 to 80% by mass and a weight average molecular weight as measured through a gel permeation chromatography and converted to polystyrene of 5,000 to 500,000 based on 100 parts by mass of the rubber component (A). When the amount of the low-molecular weight modified aromatic vinyl compound-conjugated diene compound copolymer (C) compounded is less than 5 parts by mass, the workability of the rubber composition is deteriorated.

The low-molecular weight modified aromatic vinyl compound-conjugated diene compound copolymer (C) is required to have an aromatic vinyl compound content of 5 to 80% by mass. When the bound aromatic vinyl compound content is less than 5% by mass or exceeds 80% by mass, the ensuring the workability of the rubber composition and the lowering of the loss tangent (tan δ) of the rubber composition cannot be sufficiently and simultaneously established.

Also, the low-molecular weight modified aromatic vinyl compound-conjugated diene compound copolymer (C) is required to have a vinyl bond content in the conjugated diene compound portion of 10 to 80% by mass. When the vinyl bond content in the conjugated diene compound portion is less than 10% by mass or exceeds 80% by mass, the ensuring the workability of the rubber composition and the lowering of the loss tangent (tan δ) of the rubber composition cannot be sufficiently and simultaneously established.

Further, the low-molecular weight modified aromatic vinyl compound-conjugated diene compound copolymer (C) has a weight average molecular weight as measured through a gel permeation chromatography and converted to polystyrene of 5,000 to 500,000, preferably 20,000 to 400,000, more preferably 50,000 to 400,000. When the weight average molecular weight is less than 5,000, the loss tangent (tan δ) of the rubber composition tends to rise, while when it exceeds 500,000, the workability of the rubber composition is deteriorated. Moreover, a weight average molecular weight of the low-molecular weight modified aromatic vinyl compound-conjugated diene compound copolymer (C) prior to the introduction of the functional group is preferably 5,000 to 300,000, more preferably 20,000 to 200,000, even more preferably 50,000 to 150,000 as measured through a gel permeation chromatography and converted to polystyrene. In this case, it is easy to lower the loss tangent (tan δ) and ensure the workability by making the weight average molecular weight after the introduction of the functional group within a range of 5,000 to 500,000.

The low-molecular weight modified aromatic vinyl compound-conjugated diene compound copolymer (C) has at least one functional group. As the functional group is preferable a functional group having an affinity for the reinforcing filler (B), and a nitrogen-containing functional group, a silicon-containing functional group and a tin-containing functional group are more preferable. When the functional group of the modified aromatic vinyl compound-conjugated diene compound copolymer (C) has the affinity for the reinforcing filler (B), the dispersibility of the reinforcing filler (B) in the rubber composition is improved and the workability, fracture characteristics, wear resistance and low heat buildup of the rubber composition are surely improved.

The modified aromatic vinyl compound-conjugated diene compound copolymer (C) can be obtained through (1) a method wherein the aromatic vinyl compound and conjugated diene compound as the monomer are copolymerized with the polymerization initiator to produce an aromatic vinyl compound-conjugated diene compound copolymer having an active terminal and then the active terminal is modified with various modifying agents, or (2) a method wherein the aromatic vinyl compound and conjugated diene compound as the monomer are copolymerized with a polymerization initiator having a functional group. As the aromatic vinyl compound are mentioned styrene, p-methylstyrene, m-methylstyrene, p-tert-butyl styrene, α-methylstyrene, chloromethyl styrene, vinyl toluene and so on. Among them, styrene is preferable. On the other hand, as the conjugated diene compound are mentioned 1,3-butadiene, isoprene, 1,3-pentadiene, 2,3-dimethylbutadiene and so on. Among them, 1,3-butadiene is preferable.

As a polymerization initiator used in the synthesis of the modified aromatic vinyl compound-conjugated diene compound copolymer (C) is preferable an organic alkaline metal compound, and more preferable a lithium compound. The lithium compound includes a hydrocarbyl lithium, lithium amide compound and so on, which are mentioned as the polymerization initiator used in the production of the conjugated diene-based polymer. When the above-described hydrocarbyl lithium is used as the polymerization initiator, there is obtained a copolymer having a hydrocarbyl group at a polymerization starting terminal and a polymerization active site at another terminal. Also, when the above-described lithium amide compound is used as the polymerization initiator, there is obtained a copolymer having a nitrogen-containing functional group at a polymerization starting terminal and a polymerization active site at another terminal, which has at lease one functional group without being modified with the modifying agent. Moreover, the modified aromatic vinyl compound-conjugated diene compound copolymer (C) introduced with at least one nitrogen-containing functional group selected from the group consisting of the substituted amino group represented by the formula (I) and the cyclic amino group represented by the formula (II) can be obtained by using, for example, the lithium amide compound represented by the formula: Li-AM [wherein AM is the substituted amino group represented by the formula (I) or the cyclic amino group represented by the formula (II)] as the lithium amide compound.

The modified aromatic vinyl compound-conjugated diene compound copolymer (C) can be produced in the same manner as in the above-mentioned production of the modified conjugated diene-based polymer through the anionic polymerization with properly adjusting the amounts or the like of the monomer and polymerization initiator used. Moreover, the modified aromatic vinyl compound-conjugated diene compound copolymer (C) is preferably produced through the solution polymerization. Further, since the modified aromatic vinyl compound-conjugated diene compound copolymer (C) has an aromatic vinyl compound content of 5-80% by mass, the content of the aromatic vinyl compound in the total amount of the conjugated diene compound and aromatic vinyl compound in the polymerization solution is preferably within a range of 5-80% by mass.

When the active terminal in the aromatic vinyl compound-conjugated diene compound copolymer having the active terminal is modified with the modifying agent, as the modifying agent used are preferable nitrogen-containing compounds, silicon-containing compounds, tin-containing compounds and so on. As the modifying agent are preferably used the modifying agents which can be used in the production of the above-mentioned modified conjugated diene-based polymer, in particular nitrogen-containing compounds such as bis(diethylamino)benzophenone, dimethylimidazolidinone, N-methylpyrrolidone, 4-dimethylaminobenzylidene aniline and so on, hydrocarbyloxy silane compounds represented by the formula (III) or (IV) and coupling agents represented by the formula (V). When the nitrogen-containing compound is used as the modifying agent, a nitrogen-containing functional group such as substituted and unsubstituted amino groups, amide group, imino group, imidazole group, nitrile group, isocyanate group, pyridyl group and the like can be introduced into the aromatic vinyl compound-conjugated diene compound copolymer. When the hydrocarbyloxy silane compound represented by the formula (III) or (IV) is used as the modifying agent, a silicon-containing functional group can be introduced into the aromatic vinyl compound-conjugated diene compound copolymer. When the coupling agent represented by the formula (V) is used as the modifying agent, the modified aromatic vinyl compound-conjugated diene compound copolymer (C) obtained by the modification with the coupling agent has at least one of tin-carbon bond and silicon-carbon bond. The modification with these modifying agents can be carried out in the same manner as in the production of the above-mentioned modified conjugated diene-based polymer.

In the invention, the reaction solution containing the modified aromatic vinyl compound-conjugated diene compound copolymer (C) may be dried to separate the modified aromatic vinyl compound-conjugated diene compound copolymer (C) and then the resulting modified aromatic vinyl compound-conjugated diene compound copolymer (C) may be compounded into the rubber component (A), or the reaction solution containing the modified aromatic vinyl compound-conjugated diene compound copolymer (C) may be mixed with a rubber cement of the rubber component (A) at a solution state and then dried to obtain the mixture of the rubber component (A) and the modified aromatic vinyl compound-conjugated diene compound copolymer (C).

Into the rubber composition of the invention can be properly compounded additives usually used in the rubber industry such as an antioxidant, a silane coupling agent, a vulcanization accelerator, an accelerator activator, a vulcanizing agent and the like within a scope of not damaging the object of the invention in addition to the above rubber component (A), the reinforcing filler (B) such as carbon black, silica and the like and the low-molecular weight aromatic vinyl compound-conjugated diene compound copolymer (C). As these additives can be preferably used commercially available ones. The rubber composition can be produced by compounding the rubber component (A) containing the modified conjugated diene-based polymer with the reinforcing filler (B) and the low-molecular weight aromatic vinyl compound-conjugated diene compound copolymer (C), and, if necessary, the properly selected additives and milling, warming, extruding and so on.

The tire according to the invention is characterized by using the above rubber composition, in which the rubber composition is preferably used in the tread. The tire according to the invention is not particularly limited as long as the above-mentioned rubber composition is used in any rubber member of the tire, and can be produced by the usual method. Moreover, as a gas filled into the tire can be used usual air or air having a regulated partial oxygen pressure but also inert gases such as nitrogen, argon, helium and so on.

The following examples are given in illustration of the invention and are not intended as limitations thereof.

EXAMPLES

Production Method of Polymer A

To a pressure glass vessel of 800 mL dried and purged with nitrogen are added 300 g of cyclohexane, 40 g of 1,3-butadiene, 10 g of styrene and 0.2 mmol of ditetrahydrofuryl propane, and further added 0.4 mmol of n-butyl lithium (n-BuLi), and then polymerization reaction is conducted at 50° C. for 1.5 hours. The conversion is approximately 100%. Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain a polymer A.

Production Method of Polymer B

A polymer B is obtained in the same manner as in the polymer A except that 0.48 mmol of lithium hexamethylene imide prepared in situ [HMI-Li; a molar ratio of hexamethylene imine (HMI)/lithium (Li)=0.9] in terms of a lithium equivalent is used as a polymerization initiator.

Production Methods of Polymers C and E-I

To a pressure glass vessel of 800 mL dried and purged with nitrogen are added 300 g of cyclohexane, 40 g of 1,3-butadiene, 10 g of styrene and 0.24 mmol of ditetrahydrofuryl propane, and further added 0.48 mmol of n-butyl lithium (n-BuLi), and then polymerization reaction is conducted at 50° C. for 1.5 hours. The conversion is approximately 100%. Then, a modifying agent shown in Table 1 is immediately added in an amount shown in Table 1 to the polymerization system and further modifying reaction is conducted at 50° C. for 30 minutes. Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain a polymer C or E-I.

Production Method of Polymer D

A polymer D is obtained in the same manner as in the polymer C except that 0.48 mmol of lithium hexamethylene imide prepared in situ [HMI-Li; a molar ratio of hexamethylene imine (HMI)/lithium (Li)=0.9] in terms of a lithium equivalent is used as a polymerization initiator.

<Production Method of Liquid SBR A'>

To a pressure glass vessel of 800 mL dried and purged with nitrogen are added 300 g of cyclohexane, 40 g of 1,3-butadiene, 13 g of styrene and 0.90 mmol of ditetrahydrofuryl propane, and further added 0.90 mmol of n-butyl lithium (n-BuLi), and then polymerization reaction is conducted at 50° C. for 2 hours. The conversion is approximately 100%. Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain a liquid SBR A'.

<Production Method of Liquid SBR B'>

A liquid SBR B' is obtained in the same manner as in the liquid SBR A' except that 0.90 mmol of lithium hexamethylene imide prepared in situ [HMI-LI; a molar ratio of hexamethylene imine (HMI)/lithium (Li)=0.9] in terms of a lithium equivalent is used as the polymerization initiator.

<Production Methods of Liquid SBRs C' and E'-I'>

To a pressure glass vessel of 800 mL dried and purged with nitrogen are added 300 g of cyclohexane, 40 g of 1,3-butadiene, 13 g of styrene and 0.90 mmol of ditetrahydrofuryl propane, and further added 0.90 mmol of n-butyl lithium (n-BuLi), and then polymerization reaction is conducted at 50° C. for 2 hours. The conversion is approximately 100%. Then, a modifying agent shown in Table 1 is immediately added in an amount shown in Table 2 to the polymerization system and further modifying reaction is conducted at 50° C. for 30 minutes. Thereafter, 0.5 mL of a solution of 2,6-di-t-butyl-p-cresol (BHT) in isopropanol (BHT concentration: 5% by mass) is added to the polymerization system to stop the polymerization reaction and then dried according to a usual manner to obtain a liquid SBR C' or E'-I'.

<Production Method of Liquid SBR D'>

A liquid SBR D' is obtained in the same manner as in the liquid SBR C' except that 0.90 mmol of lithium hexamethylene imide prepared in situ [HMI-Li; a molar ratio of hexamethylene imine (HMI)/lithium (Li)=0.9] in terms of a lithium equivalent is used as the polymerization initiator.

The number average molecular weight (Mn), weight average molecular weight (Mw), microstructure, bound styrene content and glass transition point of the polymers A-I produced as described above and the weight average molecular weight (Mw), microstructure and bound styrene content of the liquid SBRs A'-I' produced as described above are measured according to the following methods. The results on the polymers A-I are shown in Table 1 and the results on the liquid SBRs A'-I' are shown in Table 2.

(1) Number Average Molecular Weight (Mn) and Weight Average Molecular Weight (Mw)

The number average molecular weight (Mn) and weight average molecular weight (Mw) of each polymer and the weight average molecular weight (Mw) of each liquid SBR as converted to polystyrene are measured through a gel permeation chromatography [GPC: HLC-8020 manufactured by TOSOH, column: GMH-XL (two series columns) manufactured by TOSOH, detector: differential refractometer (RI)] as a standard of monodisperse polystyrene. The number average molecular weight before the modifying reaction and the weight average molecular weight after the modifying reaction of each polymer are shown in Table 1 and the weight average molecular weight after the modifying reaction of each liquid SBR is shown in Table 2.

(2) Microstructure and Bound Styrene Content

The microstructure of the polymer is determined by an infrared method (Morello method) and the bound styrene content of the polymer is determined from an integral ratio of $^1$H-NMR spectrum.

(3) Glass Transition Point

The glass transition point of each polymer is measured by cooling each polymer to −100° C. and then heating at a temperature rising rate of 10° C./min with a differential scanning calorimeter (DSC) type-7 instrument manufactured by PerkinElmer, Inc.

TABLE 1

|  |  | Polymer A | Polymer B | Polymer C | Polymer D | Polymer E | Polymer F | Polymer G | Polymer H | Polymer I |
|---|---|---|---|---|---|---|---|---|---|---|
| Polymerization initiator | Kind | n-BuLi | HMI-Li | n-BuLi | HMI-Li | n-BuLi | n-BuLi | n-BuLi | n-BuLi | n-BuLi |
|  | Amount used (mmol) | 0.4 | 0.48 | 0.48 | 0.48 | 0.48 | 0.48 | 0.48 | 0.48 | 0.48 |

TABLE 1-continued

| | | Polymer A | Polymer B | Polymer C | Polymer D | Polymer E | Polymer F | Polymer G | Polymer H | Polymer I |
|---|---|---|---|---|---|---|---|---|---|---|
| Modifying agent | Kind | none | none | TTC *1 | TTC *1 | DEAB *2 | DMI *3 | NMP *4 | DTESPA *5 | TESI *6 |
| | Amount used (mmol) | — | — | 0.12 | 0.12 | 0.43 | 0.43 | 0.43 | 0.43 | 0.43 |
| Bound styrene content (mass %) | | 20 | 20 | 20 | 20 | 20 | 20 | 20 | 20 | 20 |
| Vinyl bond content (%) | | 58 | 58 | 58 | 58 | 58 | 58 | 58 | 58 | 58 |
| Number average molecular weight (Mn) | | 287,000 | 230,000 | 218,000 | 221,000 | 213,000 | 210,000 | 215,000 | 210,000 | 212,000 |
| Weight average molecular weight (Mw) | | 291,000 | 238,000 | 775,000 | 662,000 | 223,000 | 219,000 | 224,000 | 320,000 | 398,000 |
| Glass transition point (° C.) | | −38 | −38 | −38 | −38 | −38 | −38 | −38 | −38 | −38 |

TABLE 2

| | | Liquid SBR A' | Liquid SBR B' | Liquid SBR C' | Liquid SBR D' | Liquid SBR E' | Liquid SBR F' | Liquid SBR G' | Liquid SBR H' | Liquid SBR I' |
|---|---|---|---|---|---|---|---|---|---|---|
| Polymerization initiator | Kind | n-BuLi | HMI-Li | n-BuLi | HMI-Li | n-BuLi | n-BuLi | n-BuLi | n-BuLi | n-BuLi |
| | Amount used (mmol) | 0.9 | 0.9 | 0.9 | 0.9 | 0.9 | 0.9 | 0.9 | 0.9 | 0.9 |
| Modifying agent | Kind | none | none | TTC *1 | TTC *1 | DEAB *2 | DMI *3 | NMP *4 | DTESPA *5 | TESI *6 |
| | Amount used (mmol) | — | — | 0.225 | 0.225 | 0.81 | 0.81 | 0.81 | 0.81 | 0.81 |
| Bound styrene content (mass %) | | 25 | 25 | 25 | 25 | 25 | 25 | 25 | 25 | 25 |
| Vinyl bond content (%) | | 65 | 65 | 65 | 65 | 65 | 65 | 65 | 65 | 65 |
| Weight average molecular weight (Mw) | | 80,000 | 80,000 | 250,000 | 260,000 | 80,000 | 80,000 | 80,000 | 200,000 | 220,000 |

*1 Tin tetrachloride.
*2 N,N'-diethylamino benzophenone.
*3 Dimethylimidazolidinone.
*4 N-methylpyrrolidone.
*5 N-(1,3-dimethylbutylidene)-3-(triethoxysilyl)-1-propaneamine.
*6 N-(3-triethoxysilylpropyl)-4,5-dihydroimidazole.

Then, a rubber composition having a compounding recipe as shown in Table 3 is prepared by using the polymers A-I and the liquid SBRs A'-I' or aromatic oil, and further vulcanized at 160° C. for 15 minutes to obtain a vulcanized rubber, and the wear resistance and loss tangent (tan δ) of the thus vulcanized rubber are measured according to the following methods. The results are shown in Tables 4-7.

(4) Wear Resistance

The wear resistance is evaluated by measuring a worn amount at a slip ratio of 60% and room temperature by means of a Lambourn abrasion tester, which is shown by an index as a wear resistance index on the basis that the wear resistance of the rubber composition using the unmodified polymer A and aromatic oil is 100. The larger the value, the better the wear resistance.

(5) Loss Tangent (tan δ)

Tan δ is measured at a temperature of 50° C., a frequency of 15 Hz and a strain of 5% by using a viscoelasticity measuring device manufactured by RHEOMETRICS Corporation, and represented by an index on the basis that the loss tangent (tan δ) of the rubber composition using the polymer A and aromatic oil is 100. The smaller the index value, the more excellent the low heat buildup.

TABLE 3

| | (parts by mass) | |
|---|---|---|
| | Formulation A | Formulation B |
| Natural rubber | 20 | 20 |
| SBR *7 | 80 | 80 |
| Carbon black *8 | 70 | — |
| Silica *9 | — | 70 |
| Aromatic oil or liquid SBR *10 | 30 | 30 |
| Stearic acid | 2 | 2 |
| Antioxidant 6C *11 | 1 | 1 |
| Silane coupling agent *12 | — | 7 |
| Zinc white | 2.5 | 2.5 |
| Vulcanization accelerator DM *13 | 0.5 | 1 |
| Vulcanization accelerator DG *14 | 0.3 | 1 |
| Vulcanization accelerator NS *15 | 0.5 | 1 |
| Sulfur | 1.5 | 1.5 |

*7 Polymers A-I produced as described above, The kind of the polymer used is shown in Tables 4-7.
*8 ISAF, a nitrogen absorption specific surface area (N₂SA) = 111 m²/g.
*9 Nipsil AQ (trade mark) manufactured by Nippon Silica Industrial Co., Ltd.
*10 Aromatic oil or the kind of the liquid SBRs A'-I' used is shown in Tables 4-7.
*11 N-(1,3-dimethylbutyl)-N'-phenyl-p-phenylenediamine.
*12 Si 69 (trade mark) manufactured by Degussa Corporation, bis(3-triethoxysilylpropyl) tetrasulfide.
*13 Mercaptobenzothiazyl disulfide.
*14 Diphenyl guanidine.
*15 N-t-butyl-2-benzothiazolyl sulfenamide.

TABLE 4

Wear resistance of each rubber composition produced according to the formulation A (index)

| | Polymer A | Polymer B | Polymer C | Polymer D | Polymer E | Polymer F | Polymer G | Polymer H | Polymer I |
|---|---|---|---|---|---|---|---|---|---|
| Aromatic oil | 100 | 102 | 103 | 107 | 106 | 106 | 101 | 101 | 100 |
| Liquid SBR A' | 111 | 129 | 131 | 144 | 123 | 133 | 127 | 120 | 120 |
| Liquid SBR B' | 120 | 147 | 149 | 162 | 141 | 151 | 144 | 138 | 138 |
| Liquid SBR C' | 121 | 149 | 151 | 164 | 143 | 153 | 147 | 140 | 140 |
| Liquid SBR D' | 128 | 162 | 164 | 178 | 156 | 167 | 160 | 153 | 153 |
| Liquid SBR E' | 117 | 141 | 143 | 157 | 135 | 146 | 139 | 132 | 132 |
| Liquid SBR F' | 122 | 151 | 153 | 167 | 145 | 156 | 149 | 142 | 142 |
| Liquid SBR G' | 119 | 144 | 147 | 160 | 138 | 149 | 142 | 136 | 136 |
| Liquid SBR H' | 116 | 138 | 140 | 153 | 132 | 142 | 136 | 129 | 129 |
| Liquid SBR I' | 119 | 144 | 147 | 160 | 138 | 149 | 142 | 136 | 136 |

TABLE 5

Loss tangent (tan δ) of each rubber composition produced according to the formulation A [index]

| | Polymer A | Polymer B | Polymer C | Polymer D | Polymer E | Polymer F | Polymer G | Polymer H | Polymer I |
|---|---|---|---|---|---|---|---|---|---|
| Aromatic oil | 100 | 98 | 99 | 95 | 96 | 96 | 98 | 96 | 96 |
| Liquid SBR A' | 91 | 84 | 83 | 77 | 86 | 82 | 85 | 87 | 86 |
| Liquid SBR B' | 87 | 76 | 75 | 70 | 79 | 75 | 77 | 80 | 80 |
| Liquid SBR C' | 87 | 75 | 75 | 69 | 78 | 74 | 76 | 79 | 79 |
| Liquid SBR D' | 84 | 70 | 69 | 64 | 72 | 68 | 71 | 74 | 74 |
| Liquid SBR E' | 88 | 79 | 78 | 72 | 81 | 77 | 80 | 82 | 82 |
| Liquid SBR F' | 86 | 75 | 74 | 68 | 77 | 73 | 75 | 78 | 78 |
| Liquid SBR G' | 88 | 77 | 76 | 71 | 80 | 75 | 78 | 81 | 81 |
| Liquid SBR H' | 89 | 80 | 79 | 74 | 82 | 78 | 81 | 84 | 84 |
| Liquid SBR I' | 88 | 77 | 76 | 71 | 80 | 75 | 78 | 81 | 81 |

TABLE 6

Wear resistance of each rubber composition produced according to the formulation B (index)

| | Polymer A | Polymer B | Polymer C | Polymer D | Polymer E | Polymer F | Polymer G | Polymer H | Polymer I |
|---|---|---|---|---|---|---|---|---|---|
| Aromatic oil | 100 | 101 | 102 | 102 | 106 | 107 | 106 | 111 | 112 |
| Liquid SBR A' | 111 | 124 | 116 | 127 | 120 | 129 | 127 | 144 | 149 |
| Liquid SBR B' | 118 | 138 | 129 | 140 | 133 | 142 | 140 | 158 | 162 |
| Liquid SBR C' | 113 | 129 | 120 | 131 | 124 | 133 | 131 | 149 | 153 |
| Liquid SBR D' | 119 | 140 | 131 | 142 | 136 | 144 | 142 | 160 | 164 |
| Liquid SBR E' | 116 | 133 | 124 | 136 | 129 | 138 | 136 | 153 | 158 |
| Liquid SBR F' | 120 | 142 | 133 | 144 | 138 | 147 | 144 | 162 | 167 |
| Liquid SBR G' | 119 | 140 | 131 | 142 | 136 | 144 | 142 | 160 | 164 |
| Liquid SBR H' | 128 | 158 | 149 | 160 | 153 | 162 | 160 | 178 | 182 |
| Liquid SBR I' | 130 | 162 | 153 | 164 | 158 | 167 | 164 | 182 | 187 |

TABLE 7

Loss tangent (tan δ) of each rubber composition produced according to the formulation B [index]

| | Polymer A | Polymer B | Polymer C | Polymer D | Polymer E | Polymer F | Polymer G | Polymer H | Polymer I |
|---|---|---|---|---|---|---|---|---|---|
| Aromatic oil | 100 | 97 | 100 | 97 | 96 | 95 | 97 | 89 | 89 |
| Liquid SBR A' | 95 | 90 | 93 | 89 | 91 | 88 | 89 | 81 | 79 |
| Liquid SBR B' | 92 | 84 | 88 | 83 | 86 | 82 | 83 | 75 | 73 |
| Liquid SBR C' | 94 | 88 | 91 | 87 | 90 | 86 | 87 | 79 | 77 |
| Liquid SBR D' | 92 | 83 | 87 | 82 | 85 | 81 | 82 | 74 | 72 |
| Liquid SBR E' | 93 | 86 | 90 | 85 | 88 | 84 | 85 | 77 | 75 |
| Liquid SBR F' | 91 | 82 | 86 | 81 | 84 | 80 | 81 | 73 | 71 |
| Liquid SBR G' | 92 | 83 | 87 | 82 | 85 | 81 | 82 | 74 | 72 |
| Liquid SBR H' | 88 | 75 | 79 | 74 | 77 | 73 | 74 | 67 | 65 |
| Liquid SBR I' | 87 | 73 | 77 | 72 | 75 | 71 | 72 | 65 | 63 |

As seen from Tables 4-7, the rubber compositions using the polymers B-I (modified conjugated diene-based polymer) as the rubber component (A) and the liquid SBRs B'-I' (low-molecular weight modified aromatic copolymer (C)) instead of the aromatic oil have highly improved low heat buildup and wear resistance as compared with the rubber compositions using the polymers B-I as the rubber component (A) and the aromatic oil.

On the other hand, the rubber compositions using the liquid SBR A' (low-molecular weight unmodified aromatic copolymer (C)) instead of the aromatic oil have improved low heat buildup and wear resistance as compared with the rubber composition using the aromatic oil, but have a lower improving degree based on the rubber compositions using the liquid SBRs B'-I'.

The invention claimed is:

1. A rubber composition comprising:
 a rubber component (A);
 a reinforcing filler (B); and
 a modified aromatic vinyl compound-conjugated diene compound copolymer (C) having at least one functional group, an aromatic vinyl compound content of 5 to 80% by mass, a vinyl bond content in a conjugated diene compound portion of 10 to 80% by mass and a weight average molecular weight as measured through a gel permeation chromatography and converted to polystyrene of more than 50,000 but not more than 200,000,
 wherein the rubber component (A) contains not less than 10% by mass of a modified conjugated diene-based polymer having at least one functional group and a weight average molecular weight as measured through a gel permeation chromatography and converted to polystyrene of 219,000 to 775,000,
 an amount of the reinforcing filler (B) compounded is not less than 20 parts by mass based on 100 parts by mass of the rubber component (A), and
 an amount of the modified aromatic vinyl compound-conjugated diene compound copolymer (C) compounded is 5 to 60 parts by mass based on the 100 parts by mass of the rubber component (A).

2. A rubber composition according to claim 1, wherein an aromatic vinyl compound in the modified aromatic vinyl compound-conjugated diene compound copolymer (C) is styrene.

3. A rubber composition according to claim 1, wherein a conjugated diene compound in the modified aromatic vinyl compound-conjugated diene compound copolymer (C) is butadiene.

4. A rubber composition according to claim 1, wherein the modified aromatic vinyl compound-conjugated diene compound copolymer (C) is a solution-polymerized styrene-butadiene copolymer rubber.

5. A rubber composition according to claim 1, wherein a weight average molecular weight of the modified aromatic vinyl compound-conjugated diene compound copolymer prior to the introduction of the functional group is 5,000 to 200,000 as measured through a gel permeation chromatography and converted to polystyrene.

6. A rubber composition according to claim 5, wherein the weight average molecular weight of the modified aromatic vinyl compound-conjugated diene compound copolymer prior to the introduction of the functional group is 20,000 to 200,000 as measured through a gel permeation chromatography and converted to polystyrene.

7. A rubber composition according to claim 6, wherein the weight average molecular weight of the modified aromatic vinyl compound-conjugated diene compound copolymer prior to the introduction of the functional group is 50,000 to 150,000 as measured through a gel permeation chromatography and converted to polystyrene.

8. A rubber composition according to claim 1, wherein the functional group of the modified aromatic vinyl compound-conjugated diene compound copolymer (C) has an affinity for the reinforcing filler.

9. A rubber composition according to claim 8, wherein the functional group of the modified aromatic vinyl compound-conjugated diene compound copolymer (C) is a nitrogen-containing functional group.

10. A rubber composition according to claim 9, wherein the nitrogen-containing functional group is a substituted or unsubstituted amino group, amide group, imino group, imidazole group, nitrile group, isocyanate group or pyridyl group.

11. A rubber composition according to claim 9, wherein the nitrogen-containing functional group is selected from the group consisting of a substituted amino group represented by the following formula (I):

wherein $R^1$ is independently an alkyl group having a carbon number of 1-12, a cycloalkyl group or an aralkyl group, and a cyclic amino group represented by the following formula (II):

wherein $R^2$ is an alkylene group having 3-16 methylene groups, a substituted alkylene group, an oxyalkylene group or a N-alkylamino-alkylene group.

12. A rubber composition according to claim 1, wherein the modified aromatic vinyl compound-conjugated diene compound copolymer (C) is obtained by reacting an active terminal of an aromatic vinyl compound-conjugated diene compound copolymer having an active terminal with at least one selected from the group consisting of a hydrocarbyloxy silane compound represented by the following formula (III):

wherein $A^I$ is a monovalent group having at least one functional group selected from (thio)epoxy, (thio)isocyanate, (thio)ketone, (thio)aldehyde, imine, amide, isocyanuric acid triester, (thio)carboxylic acid hydrocarbylester, a metal salt of (thio)carboxylic acid, carboxylic anhydride, a halide of carboxylic acid and carbonic acid dihydrocarbylester;
 $R^3$ and $R^4$ are independently a monovalent aliphatic hydrocarbon group having a carbon number of 1-20 or a monovalent aromatic hydrocarbon group having a carbon number of 6-18; $R^5$ is a single bond or a bivalent inactive hydrocarbon group having a carbon number of 1-20; n is an integer of 1-3; when plural $OR^3$s are existent, they may be same or different; and active proton and onium salt are not included in the molecules, and a hydrocarbyloxy silane compound represented by the following formula (IV):

wherein R⁶ and R⁷ are independently a monovalent aliphatic hydrocarbon group having a carbon number of 1-20 or a monovalent aromatic hydrocarbon group having a carbon number of 6-18; p is an integer of 0-2; when plural OR⁷s are existent, they may be same or different; and active proton and onium salt are not included in the molecule.

13. A rubber composition according to claim 1, wherein the modified aromatic vinyl compound-conjugated diene compound copolymer (C) has at least one tin-carbon bond or silicon-carbon bond derived from a coupling agent represented by the following formula (V):

wherein R⁸ is independently selected from the group consisting of an alkyl group having a carbon number of 1-20, a cycloalkyl group having a carbon number of 3-20, an aryl group having a carbon number of 6-20 and an aralkyl group having a carbon number of 7-20; Z is tin or silicon; X is independently chlorine or bromine; and a is 0-3 and b is 1-4 provided that a +b =4.

14. A rubber composition according to claim 1, wherein an amount of the modified aromatic vinyl compound-conjugated diene compound copolymer (C) compounded is not less than 20 parts by mass based on 100 parts by mass of the rubber component (A).

15. A rubber composition according to claim 1, wherein the reinforcing filler (B) is carbon black and/or silica.

16. A rubber composition according to claim 15, wherein an amount of carbon black compounded is not less than 50 parts by mass based on 100 parts by mass of the rubber component (A).

17. A rubber composition according to claim 15, wherein an amount of silica compounded is not less than 50 parts by mass based on 100 parts by mass of the rubber component (A).

18. A rubber composition according to claim 1, wherein the modified conjugated diene-based polymer in the rubber component (A) is a copolymer of 1,3-butadiene and an aromatic vinyl compound or a homopolymer of 1,3- butadiene.

19. A rubber composition according to claim 18, wherein the aromatic vinyl compound is styrene.

20. A rubber composition according to claim 1, wherein the modified conjugated diene-based polymer in the rubber component (A) has a glass transition point (Tg) of not higher than 0° C.

21. A rubber composition according to claim 1, wherein the modified conjugated diene-based polymer in the rubber component (A) is formed through a polymerization using an organic alkaline metal compound or a rare-earth metal compound.

22. A rubber composition according to claim 21, wherein the organic alkaline metal compound is an alkyl lithium.

23. A rubber composition according to claim 1, wherein the functional group of the modified conjugated diene-based polymer in the rubber component (A) has an affinity for the reinforcing filler (B).

24. A rubber composition according to claim 23, wherein the functional group of the modified conjugated diene-based polymer in the rubber component (A) is a nitrogen-containing functional group.

25. A rubber composition according to claim 24, wherein the nitrogen-containing functional group is a substituted or unsubstituted amino group, amide group, imino group, imidazole group, nitrile group, isocyanate group or pyridyl group.

26. A rubber composition according to claim 24, wherein the nitrogen-containing functional group is selected from the group consisting of a substituted amino group represented by the following formula (I):

wherein R¹ is independently an alkyl group having a carbon number of 1-12, a cycloalkyl group or an aralkyl group, and a cyclic amino group represented by the following formula (II):

wherein R² is an alkylene group having 3-16 methylene groups, a substituted alkylene group, an oxyalkylene group or a N-alkylamino-alkylene group.

27. A rubber composition according to claim 1, wherein the modified conjugated diene-based polymer in the rubber component (A) is obtained by reacting an active terminal of a conjugated diene-based polymer having an active terminal with at least one selected from the group consisting of a hydrocarbyloxy silane compound represented by the following formula (III):

wherein A¹ is a monovalent group having at least one functional group selected from (thio)epoxy, (thio)isocyanate, (thio)ketone, (thio)aldehyde, imine, amide, isocyanuric acid triester, (thio)carboxylic acid hydrocarbylester, a metal salt of (thio)carboxylic acid, carboxylic anhydride, a halide of carboxylic acid and carbonic acid dihydrocarbylester;

R³ and R⁴ are independently a monovalent aliphatic hydrocarbon group having a carbon number of 1-20 or a monovalent aromatic hydrocarbon group having a carbon number of 6-18; R⁵ is a single bond or a bivalent inactive hydrocarbon group having a carbon number of 1-20; n is an integer of 1-3; when plural OR³s are existent, they may be same or different; and active proton and onium salt are not included in the molecule, and a hydrocarbyloxy silane compound represented by the following formula (IV):

wherein R⁶ and R⁷ are independently a monovalent aliphatic hydrocarbon group having a carbon number of 1-20 or a monovalent aromatic hydrocarbon group having a carbon number of 6-18; p is an integer of 0-2; when plural OR⁷s are existent, they may be same or different; and active proton and onium salt are not included in the molecule.

28. A rubber composition according to claim 1, wherein the modified conjugated diene-based polymer in the rubber component (A) has at least one tin-carbon bond or silicon-carbon bond derived from a coupling agent represented by the following formula (V):

$$R^8_a Z X_b \quad (V)$$

wherein $R^8$ is independently selected from the group consisting of an alkyl group having a carbon number of 1-20, a cycloalkyl group having a carbon number of 3-20, an aryl group having a carbon number of 6-20 and an aralkyl group having a carbon number of 7-20; Z is tin or silicon; X is independently chlorine or bromine; and a is 0-3 and b is 1-4 provided that a +b =4.

29. A rubber composition according to claim 1, wherein the rubber component (A) contains natural rubber and/or polyisoprene rubber.

30. A tire using a rubber composition as claimed in claim 1.

* * * * *